US011878230B2

(12) United States Patent
Mitchell, Jr.

(10) Patent No.: US 11,878,230 B2
(45) Date of Patent: Jan. 23, 2024

(54) LET DETECTION SYSTEM FOR MONITORING MOVEMENT OF A NET CORD

(71) Applicant: SportsMEDIA Technology Corporation, Durham, NC (US)

(72) Inventor: Frank C. Mitchell, Jr., Jacksonville, FL (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 0 days.

(21) Appl. No.: 17/858,625

(22) Filed: Jul. 6, 2022

(65) Prior Publication Data

US 2023/0226429 A1 Jul. 20, 2023

Related U.S. Application Data

(63) Continuation of application No. 17/672,279, filed on Feb. 15, 2022, now Pat. No. 11,383,145.

(60) Provisional application No. 63/301,000, filed on Jan. 19, 2022.

(51) Int. Cl.
*A63B 71/06* (2006.01)
*H04W 4/80* (2018.01)
*A63B 61/00* (2006.01)

(52) U.S. Cl.
CPC ........ *A63B 71/0605* (2013.01); *A63B 61/003* (2013.01); *H04W 4/80* (2018.02); *A63B 2071/0611* (2013.01); *A63B 2071/0613* (2013.01); *A63B 2225/50* (2013.01)

(58) Field of Classification Search
CPC .............. A63B 71/0605; A63B 61/003; A63B 2071/0611; A63B 2071/0613
See application file for complete search history.

(56) References Cited

U.S. PATENT DOCUMENTS

| 3,415,517 A | 12/1968 | Kelvin |
| 3,924,261 A | 12/1975 | Kardashian |
| 4,004,805 A | 1/1977 | Chen et al. |
| 4,081,798 A | 3/1978 | Pelfrey |
| 4,398,724 A | 8/1983 | Wilson et al. |
| 4,432,058 A * | 2/1984 | Supran ............... A63B 71/0605 700/91 |
| 4,840,377 A | 6/1989 | Bowser et al. |
| 4,859,986 A | 8/1989 | Auken et al. |

(Continued)

FOREIGN PATENT DOCUMENTS

| AT | 373493 B | 1/1984 |
| AU | 2019101056 A4 | 10/2019 |

(Continued)

*Primary Examiner* — James S. McClellan
(74) *Attorney, Agent, or Firm* — NEO IP

(57) ABSTRACT

A let detection system includes a sensor including an accelerometer attached to a tennis net. The sensor is in wireless communication with an umpire device able to send a message to the sensor, wherein the message causes the sensor to calibrate and begin monitoring for a let. The sensor determines a three-dimensional (3D) vector representing the gravity acting on the sensor as a baseline. When the sensor detects vertical acceleration of the net relative to the baseline and the vertical motion is above a preset threshold, the sensor automatically transmits a let notification message to the umpire device.

20 Claims, 6 Drawing Sheets

(56) References Cited

U.S. PATENT DOCUMENTS

| | | | |
|---|---|---|---|
| 4,894,528 A | | 1/1990 | Diaconu et al. |
| 5,138,322 A | | 8/1992 | Nuttall |
| 5,585,778 A | * | 12/1996 | Brauer ............... A63B 71/0605 |
| | | | 473/467 |
| 5,908,361 A | | 6/1999 | Fisher et al. |
| 9,267,862 B1 | * | 2/2016 | Kavars ............... G01M 5/0033 |
| 9,687,707 B2 | | 6/2017 | Goldstein |
| 9,737,784 B1 | | 8/2017 | Kliebhan et al. |
| 10,080,943 B2 | | 9/2018 | Goldstein |
| 10,272,307 B2 | | 4/2019 | Goldstein |
| 10,441,866 B2 | | 10/2019 | Vilar |
| 10,583,341 B2 | | 3/2020 | Goldstein |
| 2006/0287140 A1 | | 12/2006 | Brandt et al. |
| 2009/0017919 A1 | | 1/2009 | Brennan |
| 2016/0030829 A1 | | 2/2016 | Rowsey |
| 2020/0171367 A1 | | 6/2020 | Goldstein |
| 2021/0213335 A1 | | 7/2021 | Goldstein |

FOREIGN PATENT DOCUMENTS

| | | |
|---|---|---|
| AU | 2019226223 A1 | 10/2019 |
| AU | 2021209276 A1 | 8/2021 |
| AU | 2021107541 A4 | 1/2022 |
| DE | 3843266 A1 | 6/1990 |
| GB | 2107122 A | 4/1983 |
| GB | 2070942 B | 10/1983 |
| GB | 2394426 A | 4/2004 |
| GB | 2575893 B | 7/2020 |
| GB | 2587846 A | 4/2021 |
| GB | 2596418 A | 12/2021 |
| WO | 2020163159 A1 | 8/2020 |

\* cited by examiner

LET DETECTION SYSTEM FOR MONITORING MOVEMENT OF A NET CORD

CROSS-REFERENCES TO RELATED APPLICATIONS

This application relates to and claims priority from the following U.S. Patent Applications. This application is a continuation of U.S. application Ser. No. 17/672,279, filed Feb. 15, 2022, which claims priority from and the benefit of U.S. Provisional Patent Application No. 63/301,000, filed Jan. 19, 2022, each of which is incorporated herein by reference in its entirety.

BACKGROUND OF THE INVENTION

1. Field of the Invention

The present invention relates to tennis net cord sensors, and more specifically to let detection systems using sensors including accelerometers to detect the movement of a net cord.

2. Description of the Prior Art

It is generally known in the prior art to provide let detection systems. In tennis, a let most commonly occurs when a ball is served and clips the center net before landing in the correct service box. When this occurs, players or an umpire call a let and the point is replayed. By contrast, if the ball hits the net and lands outside the correct service box, a fault is called. In casual games, lets are often simply called by players when they hear the tennis ball strike the net or visually see the contact. However, in professional games, sensors are commonly used to detect an instance of a let. Examples of existing let detection systems utilize force sensors, piezoelectric sensors, and laser-based sensors.

Prior art patent documents include the following:

U.S. Pat. No. 10,583,341 for Tennis net tension system including service let indication feature by inventor Goldstein, filed Feb. 15, 2019 and issued Mar. 10, 2020, discloses a system and method for measuring the tension of a tennis net, and, alternatively or in addition, for determining if a service let occurs via the measuring of the net tension. The embodiments measure a force exerted on the center-strap or the singles stick by the net. In these embodiments, the measured force provides an accurate reflection of the tension of the net.

U.S. Pat. No. 4,081,798 for Let-ball detectors by inventor Pelfrey, filed Mar. 14, 1977 and issued Mar. 28, 1978, discloses electric currents induced by a magnetic field being moved in relation to a fixed coil, by a vertical displacement of the net cable/tennis net, enabling a referee to detect the occurrence of a "let-ball."

U.S. Pat. No. 4,859,986 for Object touchdown and net contact detection systems and game apparatus employing same by inventors Van Auken et al., filed Sep. 24, 1987 and issued Aug. 22, 1989, discloses systems for automatically determining whether a conductive, volant game device touches down in bounds or out of bounds on a playing surface. The system includes boundary line and out of bounds circuits which can be completed by the touchdown of the game device thereupon. A control unit processes the signal generated by each completed circuit and turns on a signal which is coded to indicate whether the device touched down in bounds or out of bounds. Associated circuits and control capabilities provide a signal when the game device touches the top of a net or other barrier in games in which that type of contact is significant.

U.S. Pat. No. 5,585,778 for Device for detecting net faults in tennis by inventors Brauer et al., filed Jul. 20, 1994 and issued Dec. 17, 1996, discloses a device for detecting net faults in tennis including a sensor mounted near or on the net or its anchoring components. The sensor is an accelerometer or a piezoelectric transducer that generates an electrical signal. The signal is processed and drives an audio output device or an optical output device.

US Patent Publication No. 2016/0030829 for Tennis scoring and display systems and methods by inventor Rowsey, filed Jul. 30, 2014 and published Feb. 4, 2016, discloses a scoring and display system. The scoring and display system may include a weather and waterproof display housing providing a plurality of display screens electronically interconnected to a sound system, a power source and a control circuitry. The control circuitry may be configured to store and recognize a voice imprint of at least one predetermined game player. The control circuitry may be configured to store and recognize a plurality of scoring nomenclature, voice instructions and game commands of the at least one predetermined game player. The control circuitry may be configured to make the plurality of display screens and the sound system voice operable by and interactive to only the at least one predetermined game player. The plurality of display screens may be designed to represent the plurality of scoring nomenclature, voice instructions and game commands electronically through the plurality of display screens and audibly through the sound system. The scoring and display system is adaptable of a plurality of athletic competitions, including tennis.

U.S. Pat. No. 10,441,866 for Method and system for determining whether a spherical element impacts with a component of a playing field, or arranged on or proximate thereto by inventor Vilar, filed Mar. 12, 2018 and issued Oct. 15, 2019, discloses a method and system for determining whether a spherical element impacts with a component of a playing field, or arranged on or proximate thereto. The method includes acquiring images of a surveillance area of a field that covers at least part of said component, such as a delimiting perimeter line of a game area or a target, performing an approximate detection of an impact of a spherical element relative to that component or proximate thereto, with an object detection and recognition system that can discern when the detected object is indeed a spherical element, automatically selecting one of the images acquired for the same point in time and that includes the area where said impact has occurred, and analyzing the selected image to check if the spherical element has impacted or not with the component.

U.S. Pat. No. 5,908,361 for Automated tennis line calling system by inventors Fisher et al., filed Jun. 6, 1997 and issued Jun. 1, 1999, discloses a system for the automatic detection of ball bounces on a tennis court, which is applicable to similar games. The system comprises a sonar-like sound system in conjunction with a pressure-sensitive system located on the court surface itself. The sound system uses a multiplicity of microphones to detect and means to analyze the sounds and to calculate the position of sounds identified as balls striking the court surface. The pressure system is used to detect ball bounces on the boundary lines themselves, and utilizes coaxial cables as the sensing elements. The pressure system is checked only when the sound system determines that a ball is bouncing on or near one of the boundary lines. Processing is done by a personal computer to which a special interface card is added.

U.S. Pat. No. 4,894,528 for Laser beam lawn tennis net referee by inventors Diaconu et al., filed Jun. 20, 1988 and issued Jan. 16, 1990, discloses low intensity laser oscillators producing precisely located beams on each side of the net detected by laser receivers on the opposite end of the net along with appropriate electronics to monitor and announcing each time that the served balls intercept the beams and cause the laser beams to not be detected by the appropriate receiver.

U.S. Pat. No. 9,737,784 for Automated officiating and player development system for sports that utilize a netted court by inventors Kliebhan et al., filed Dec. 10, 2013 and issued Aug. 22, 2017, discloses an automated officiating and player development system for a game played on a court with a net. The system utilizes arrays of optical imaging devices that are positioned near the net and face outwardly toward the two halves of the court. Each of the arrays scan across the court in two scan fields, wherein a first scan field projects across the court in an area below an elevated second scan field. The second scan field is positioned a few inches above the first scan field. In this manner, any object that contacts the court from above must pass through both the first scan field and the second scan field. Separate arrays of optical detecting devices are positioned along the net. All the arrays produce pixilated images of any object they scan. A processor analyzes the pixilated images to identify the pixilated images of the detected objects.

U.S. Pat. No. 5,138,322 for Method and apparatus for radar measurement of ball in play by inventor Nuttall, filed Aug. 20, 1991 and issued Aug. 11, 1992, discloses a system for continuously and precisely measuring the positions of a generally symmetrical object, e.g., a tennis ball, in motion in a predefined three-dimensional region, e.g., a tennis court, which transmits multiple radar signals from first, second, and third, spaced antenna devices, respectively, into the three-dimensional region. Multiple return signals are sensed and are compared with the transmitted signals to determine the phases of the return signals, to thereby obtain ambiguous ranges of the object. Ambiguities are removed by using the Chinese Remainder Theorem to obtain less-ambiguous ranges. Time-of-arrival range information is used in conjunction with the less-ambiguous ranges to provide unambiguous ranges over the range of interest. The unambiguous ranges are used to compute three-dimensional coordinates of the object that are accurate to within approximately 0.1 inches. A mathematical model defining boundaries of the three-dimensional region is completed by placing signal reflector devices on various boundary points of the three-dimensional region, and transmitting the radar signals when the object is not in the three-dimensional region. Coordinates of a projected trajectory are computed and compared with the actual coordinates of the object, and certain characteristics are computed therefrom. Calibration of the system is maintained by placing signal reflector devices at various fixed locations within the region of interest and the return signals are processed to obtain an initial survey of the region and then to periodically resurvey the region.

U.S. Pat. No. 4,840,377 for Electrical tape boundary sensor apparatus by inventors Bowser et al., filed Dec. 14, 1987 and issued Jun. 20, 1989, discloses a system that analyzes the output voltage caused by the impact of an object, particularly a tennis ball, relative to a boundary line. It combines sensors mounted on a tennis court's surface with computer graphics and data acquisition software that indicates to a tennis umpire, line judge or player that the ball or other object has struck a boundary line.

U.S. Pat. No. 4,004,805 for Electronic line monitoring system for a tennis court by inventors Chen et al., filed Aug. 30, 1974 and issued Jan. 25, 1977, discloses an optical tennis line sensing system employing a double beam laser for projecting only a pair of collimated beams of light along the entire outer boundary and base lines of a tennis court with one beam positioned on the line slightly above the playing surface and the remaining being positioned slightly outside the lines. A detector circuit including photo multiplier light sensors detects interruptions of the light beam in a timed sequence for generating a signal indicating when a tennis ball is out of bounds. The detector circuit discriminates between momentary interruption of one of the light beams by a tennis ball and interruption of one or both of the light beams by the player's foot. Display means coupled to the detector circuit displays only out-of-bounds shots which are marginal and which cannot be accurately called by the line judges. A laser beam and photomultiplier and associated detection and display circuit are also employed at the service lines and along the top of the net to detect fault and let services respectively.

British Patent No. 2,070,942 for Detecting Tennis Net Vibration by inventor Carlton, filed Mar. 7, 1980 and issued Oct. 5, 1983, discloses a post or cable supporting the net in tennis and either or both incorporates a switch which is set off by the vibration caused by a tennis ball striking the net or its strap or band. The switch actuates a signal and the switch is controlled by a master switch.

British Patent Publication No. 2,107,122 for Electrical contact indicating device by inventor Kinnersly, filed Oct. 3, 1981 and published Apr. 20, 1983, discloses a contact indicating device, specifically for use in determining when a "let" has taken place during a game of tennis, comprises a hollow outer member, which is electrically conductive on its interior, providing the net cord of the tennis net, and an electrically conductive member within the outer member. Mounted on the inner member are electric contact members and spacer members which at rest, maintain the contact members spaced from the interior of the outer member. The mechanism also comprises power means operative to establish an electric potential between the inner and outer members, and indicator means which is operative in the event that conductive engagement between the contact elements and the outer member has taken place. Thus in the use of the mechanism during a game of tennis, when the net cord is struck by a tennis ball with a specific minimum force, the contact elements move into engagement with the outer member and the indicating mechanism indicates that such movement has taken place.

British Patent Publication No. 2,394,426 for Net vibration sensor apparatus by inventor Pinney, filed Jun. 2, 2003 and published Apr. 28, 2004, discloses an electronic sensor apparatus useful to detect the contact of an object with a net such as those employed in ball games like tennis, which sensor apparatus comprises: a vibration sensor mountable in direct physical contact with the net so as directly to receive and act upon vibrations thereof; circuitry to receive and operate upon signals from the sensor; warning-producing means driven by the aforesaid circuitry; and a power source and an on/off switch.

German Patent Publication No. DE3843266 for Indicating device for ball games with a net, in particular tennis by inventor Gulcz, filed Dec. 22, 1988 and published Jun. 28, 1990, discloses an indicating device for ball games with a net, in particular for tennis, having at least one electrical measuring sensor fitted into the upper edge of the ball game net. The said sensor responds to mechanical vibrations occurring in the said net to contact by the ball, lies in an electric circuit containing an optical or acoustic signal transmitter and, when it responds, triggers the transmission of a signal.

Austrian Patent No. AT373493 for System for displaying net balls in ball games by inventor Prinz, filed Jun. 22, 1979 and issued Jan. 25, 1984, discloses a system for displaying net balls in ball games with a net dividing the playing field, tensioned via a rope or the like, and an accelerometer connected to the rope or the like and serving as a vibration sensor, which is transmitted through a transmission path with a display device is connected.

SUMMARY OF THE INVENTION

The present invention relates to tennis net cord sensors, and more specifically to let detection systems using sensors including accelerometers to detect the movement of a net cord.

It is an object of this invention to provide a system that is able to accurately detect contact between a ball and a net cord, minimizing false positives from external factors, such as wind.

In one embodiment, the present invention is directed to a system for detecting net cord contact, including at least one sensor, coupled with a processor and a memory, attached to a net including a net cord, wherein the at least one sensor is in network communication with at least one umpire device, wherein the at least one sensor includes at least one accelerometer, operable to generate three-dimensional (3D) acceleration data, wherein the at least one sensor is operable to detect when the net cord is substantially at rest and determine an adjusted vertical axis when the net cord is substantially at rest, wherein the at least one sensor is operable to automatically determine a vertical acceleration for the net cord, wherein the vertical acceleration is a component of the 3D acceleration data along the adjusted vertical axis, and wherein the at least one sensor is configured to transmit an alert to the at least one umpire device when a change in the vertical acceleration of the net cord exceeds a preset threshold.

In another embodiment, the present invention is directed to a method for detecting net cord contact, including providing at least one sensor, coupled with a processor and a memory, attached to a net including a net cord, wherein the at least one sensor is in network communication with at least one umpire device, the at least one sensor including at least one accelerometer, the at least one accelerometer generating three-dimensional (3D) acceleration data, the at least one sensor detecting when the net cord is substantially at rest and determining an adjusted vertical axis when the net cord is substantially at rest, the at least one sensor automatically determining a vertical acceleration for the net cord, wherein the vertical acceleration is a component of the 3D acceleration data along the adjusted vertical axis, and the at least one sensor transmitting an alert to the at least one umpire device when a change in the vertical acceleration of the net cord exceeds a preset threshold.

In yet another embodiment, the present invention is directed to a system for detecting net cord contact, including at least one sensor, coupled with a processor and a memory, attached to a net including a net cord, wherein the at least one sensor is in network communication with at least one umpire device, wherein the at least one sensor includes at least one net strap sensor attached to a net strap, wherein the net strap is a component of the net in tension with the net cord, wherein the at least one sensor includes one or more sensors attached directly to the net cord, wherein the at least one sensor includes at least one accelerometer, operable to generate three-dimensional (3D) acceleration data in real time, wherein the at least one sensor is operable to detect when the net cord is substantially at rest and determine an adjusted vertical axis when the net cord is substantially at rest, wherein the at least one sensor is operable to automatically determine a vertical acceleration for the net cord, wherein the vertical acceleration is a component of the 3D acceleration data along the adjusted vertical axis, and wherein the at least one sensor is configured to transmit an alert to the at least one umpire device when a change in the vertical acceleration of the net cord exceeds a preset threshold.

In still another embodiment, the present invention is directed to a system for detecting net cord contact, including at least one sensor, coupled with a processor and a memory, attached to a net including a net cord, wherein the at least one sensor is in network communication with at least one umpire device, wherein the at least one sensor includes at least one net strap sensor attached to a net strap, wherein the net strap is a component of the net in tension with the net cord, wherein the at least one sensor includes at least one accelerometer, operable to generate three-dimensional (3D) acceleration data in real time, wherein the at least one sensor is operable to detect when the net cord is substantially at rest and determine an adjusted vertical axis when the net cord is substantially at rest, wherein the at least one sensor is operable to automatically determine a vertical acceleration for the net cord, wherein the vertical acceleration is a component of the 3D acceleration data along the adjusted vertical axis, wherein the at least one sensor is configured to transmit an alert to the at least one umpire device when a change in the vertical acceleration of the net cord exceeds a preset threshold, and wherein the at least one umpire device is operable to receive a single command, allowing the at least one umpire device to receive additional alerts from the at least one sensor and resetting a shot clock.

These and other aspects of the present invention will become apparent to those skilled in the art after a reading of the following description of the preferred embodiment when considered with the drawings, as they support the claimed invention.

DETAILED DESCRIPTION

Figure 1:
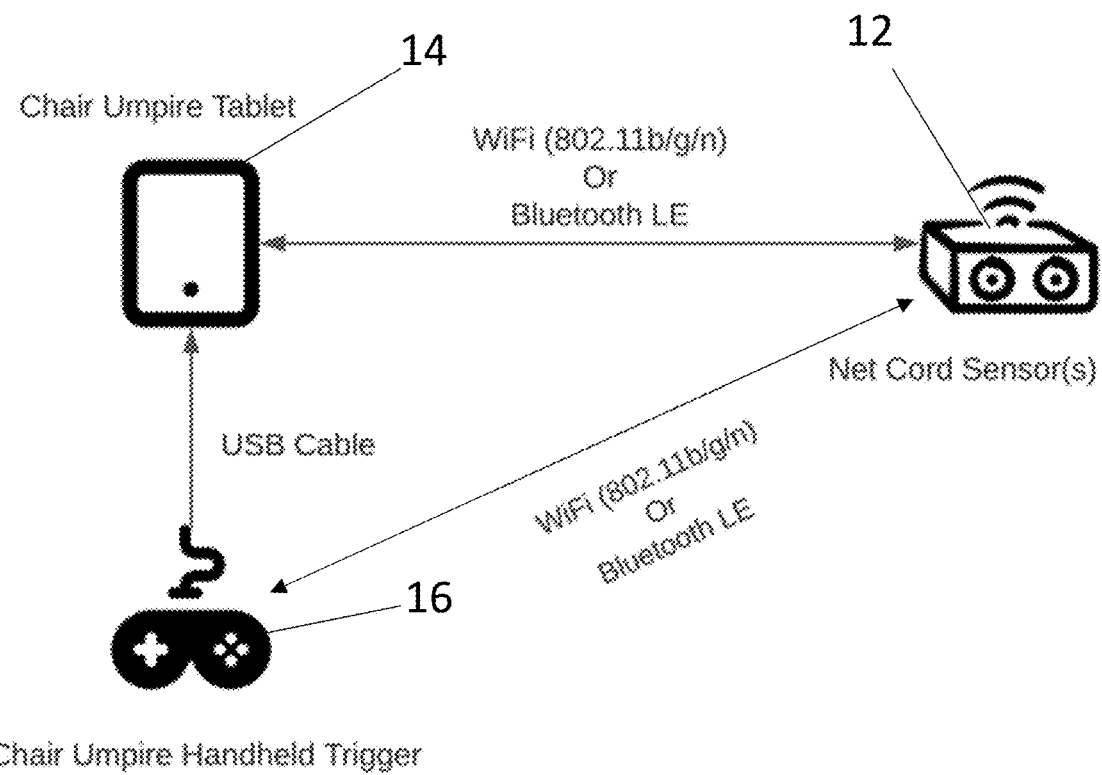
FIG. 1 illustrates a schematic diagram of the components of a let detection system according to one embodiment of the present invention.

The present invention is generally directed to tennis net cord sensors, and more specifically to let detection systems using sensors including accelerometers to detect the movement of a net cord.

In one embodiment, the present invention is directed to a system for detecting net cord contact, including at least one sensor, coupled with a processor and a memory, attached to a net including a net cord, wherein the at least one sensor is in network communication with at least one umpire device, wherein the at least one sensor includes at least one accelerometer, operable to generate three-dimensional (3D) acceleration data, wherein the at least one sensor is operable to detect when the net cord is substantially at rest and determine an adjusted vertical axis when the net cord is substantially at rest, wherein the at least one sensor is operable to automatically determine a vertical acceleration for the net cord, wherein the vertical acceleration is a component of the 3D acceleration data along the adjusted vertical axis, and wherein the at least one sensor is configured to transmit an alert to the at least one umpire device when a change in the vertical acceleration of the net cord exceeds a preset threshold.

In another embodiment, the present invention is directed to a method for detecting net cord contact, including providing at least one sensor, coupled with a processor and a memory, attached to a net including a net cord, wherein the at least one sensor is in network communication with at least one umpire device, the at least one sensor including at least one accelerometer, the at least one accelerometer generating three-dimensional (3D) acceleration data, the at least one sensor detecting when the net cord is substantially at rest and determining an adjusted vertical axis when the net cord is substantially at rest, the at least one sensor automatically determining a vertical acceleration for the net cord, wherein the vertical acceleration is a component of the 3D acceleration data along the adjusted vertical axis, and the at least one sensor transmitting an alert to the at least one umpire device when a change in the vertical acceleration of the net cord exceeds a preset threshold.

In yet another embodiment, the present invention is directed to a system for detecting net cord contact, including at least one sensor, coupled with a processor and a memory, attached to a net including a net cord, wherein the at least one sensor is in network communication with at least one umpire device, wherein the at least one sensor includes at least one net strap sensor attached to a net strap, wherein the net strap is a component of the net in tension with the net cord, wherein the at least one sensor includes one or more sensors attached directly to the net cord, wherein the at least one sensor includes at least one accelerometer, operable to generate three-dimensional (3D) acceleration data in real time, wherein the at least one sensor is operable to detect when the net cord is substantially at rest and determine an adjusted vertical axis when the net cord is substantially at rest, wherein the at least one sensor is operable to automatically determine a vertical acceleration for the net cord, wherein the vertical acceleration is a component of the 3D acceleration data along the adjusted vertical axis, and wherein the at least one sensor is configured to transmit an alert to the at least one umpire device when a change in the vertical acceleration of the net cord exceeds a preset threshold.

In still another embodiment, the present invention is directed to a system for detecting net cord contact, including at least one sensor, coupled with a processor and a memory, attached to a net including a net cord, wherein the at least one sensor is in network communication with at least one umpire device, wherein the at least one sensor includes at least one net strap sensor attached to a net strap, wherein the net strap is a component of the net in tension with the net cord, wherein the at least one sensor includes at least one accelerometer, operable to generate three-dimensional (3D) acceleration data in real time, wherein the at least one sensor is operable to detect when the net cord is substantially at rest and determine an adjusted vertical axis when the net cord is substantially at rest, wherein the at least one sensor is operable to automatically determine a vertical acceleration for the net cord, wherein the vertical acceleration is a component of the 3D acceleration data along the adjusted vertical axis, wherein the at least one sensor is configured to transmit an alert to the at least one umpire device when a change in the vertical acceleration of the net cord exceeds a preset threshold, and wherein the at least one umpire device is operable to receive a single command, allowing the at least one umpire device to receive additional alerts from the at least one sensor and resetting a shot clock.

Rule 22 of the International Tennis Federation (ITF) 2021 Rules of Tennis, which is incorporated herein by reference in its entirety, states that a service is a let if "the ball served touches the net, strap, or band and is otherwise good; or, after touching the net, strap or band, touches the receiver or the receiver's partner or anything they wear or carry before hitting the ground." Additionally, Rule 22 states that "in the case of a service let, that particular service shall not count, and the server shall serve again, but a service let does not cancel a previous fault." Therefore, it is imperative in tennis, especially in professional games, to accurately determine whether a service contacts the net cord.

None of the prior art discloses a let detection system utilizing an accelerometer to detect vertical motion of a tennis net cord. While let detection systems are known in the art, the existing systems employ different ways to detect contact between a ball and a net cord. For example, U.S. Pat. No. 10,583,341 utilizes a scale connected to the net cord, which is used to detect tension on the net cord as a result of contact with a ball. However, the sensitivity of such a system is necessarily limited by the tension of the net cord, which often changes between matches, or even within a single match. Furthermore, because force-based systems necessarily require a threshold force in order to filter out confounding effects (e.g., wind), these systems often fail to detect slight contact to the upper portion of the net cord because such contacts exert little force on the net cord. Other prior systems, such as the laser-based system described in U.S. Pat. No. 4,894,528 detect contact with the net when a laser aimed proximate to the net cord is interrupted. However, these systems also suffer from high sensitivity to external factors, as insects or even simply dust are easily able to obstruct the path of the laser.

Previous patents disclose the use of accelerometers for detecting vibrations on a tennis net, but fail to filter out horizontal acceleration of the net so as to not provide false indications of net contact. For example, U.S. Pat. No. 5,585,778 and British Patent Nos. 2,394,426 and 2,070,942 disclose the use of sensors to detect tennis net vibrations. However, the functionality of these inventions is based on faulty assumptions such as the following passage included in British Patent No. 2,394,426: "It has now been found that a vibration sensor in direct physical contact with the net . . . can very effectively detect even the slightest contact of the ball with the net. This is because the detection method is not limited to being reliant on a sound being made by the collision of the ball with the net, but instead detects directly the tell-tale vibration through the net that occurs as a result of the contact. In addition, the functionality of the sensor is not affected by weather conditions (because of the tautness of the net) or background noise." The idea that weather conditions do not affect the functionality of the sensor relies on the assumption that the magnitude of movement of the net motion as a result of wind, rain or other weather conditions is less than the magnitude of the movement of the net as a result of contact with a ball. However, in instances where the ball grazes the top of the net cord, this assumption is unfounded, as the ball still contacts the net in these instances but does not cause a magnitude of acceleration of the net that is necessarily greater that acceleration of the net caused by environment conditions. Furthermore, prior art inventions rely on the net being fully taut and fully straight, but this is frequently not the case as net tension often decreases throughout a match, causing the net to be neither fully straight nor taut, which introduces new variables for which prior art systems do not adequately account.

The inadequacy of current let detection systems has been a source of controversy in recent years. Electronic net judges were introduced in the 1990s to assist the chair umpire in making decisions regarding whether a let has occurred. This has led to controversial calls, such as a let call in the first round of the 2016 U.S. Open in a match between Novak Djokovic and Jerzy Janowicz that left some players demanding a new let detection system. Let detection systems again caused controversy in the 2021 Australian Open match between Nick Krygios and Ugo Humbert due to being overly sensitive and indicating lets when the ball was inches or more above the net. Therefore, there is a clear need for an improved let detection system that improves upon the accuracy of present systems.

Referring now to the drawings in general, the illustrations are for the purpose of describing one or more preferred embodiments of the invention and are not intended to limit the invention thereto.

FIG. 1 illustrates a schematic diagram of the components of a let detection system according to one embodiment of the present invention. The system includes at least one net cord sensor 12, attached to a portion of the tennis net (e.g., attached to the net cord, attached to the center strap in tension with the net cord, attached to the netting, etc.). The at least one net cord sensor 12 includes three sensors as illustrated in FIG. 1. In another embodiment, the at least one net cord sensor 12 includes one sensor, two sensors, four sensors, five sensors, six sensors, or seven sensors. In one embodiment, the at least one net cord sensor 12 is in wireless communication with at least one umpire device 14. In one embodiment, the at least one umpire device 14 is able to "arm" the at least one net cord sensor 12 such that the at least one net cord sensor 12 becomes operable to detect a net cord contact. In another embodiment, the at least one net cord sensor 12 is always operable to detect a net cord contact. In yet another embodiment, the at least one net cord sensor 12 is automatically operable to detect a net cord contact when a service begins or is about to begin. In one embodiment, when the at least one net cord sensor 12 detects that a ball has contacted the net cord, a message is displayed on a display of the at least one umpire device 14 indicating that a contact has occurred. In one embodiment, the displayed message is accompanied by at least one auditory sound, at least one color indicator such as a light emitting diode (LED) indicator, and/or at least one haptic feedback response, such as a vibration. A display of the at least one umpire device includes a liquid crystal display (LCD) in one embodiment. The display is operable to provide feedback on battery statuses of the net cord sensors, an indication that the sensor is armed or disarmed, confirmation that the sensors are communicating properly with the device, and/or an indication of when the net was contacted during the let. In one embodiment, the wireless communication includes WI-FI (e.g., a local area network under standard 802.11) and/or BLUETOOTH communication. In one embodiment, the sensor is not in direct communication with a shot clock system, such that the sensor is not able to automatically reset the shot clock.

In one embodiment, the at least one umpire device 14 includes at least one display integrated with the at least one umpire device 14, and the at least one umpire device 14 is connected to at least one trigger device 16. The at least one display shows whether a let has occurred, while the at least one trigger device 16 is able to arm and disarm the at least one net cord sensor. In one embodiment, the at least one trigger device 16 and the at least one umpire device 14 are in wired connection (e.g., by a Universal Serial Bus (USB) cable). Alternatively, the at least one umpire device 14 and the at least one trigger device 16 are in wireless communication, such as via WI-FI or BLUETOOTH communication. In another embodiment, the at least one trigger device 16 is in direct wireless communication, such as via WI-FI or BLUETOOTH communication, with the at least one net cord sensor, without using the at least one umpire device 14 as an intermediary. In one embodiment, the at least one trigger device 16 and/or the at least one umpire device 14 is also able to start, stop, and/or reset a shot clock. Examples of umpire devices include, but are not limited to, devices having a processor, a memory, and a display, such as a tablet, smart phone, and/or a computer. In one embodiment, calibrating the at least one net cord sensor 12 and resetting a shot clock occur simultaneously upon a single action received through the at least one umpire device 14 in one embodiment of the present invention. The single action is operable to be activation of a physical button on the at least one umpire device 14, activation of a virtual button on the at least one umpire device 14, activation of a physical button on the at least one trigger device 16, or activation of a virtual button on the at least one trigger device 16. Alternatively, resetting the shot clock and/or calibration of the at least one net cord sensor 12 occurs automatically after at least one play detector in communication with the at least one umpire device 14 or the at least one sensor 12 detects that a ball has not contacted an inbounds area of a court within a predetermined time period after a ball last contacted an inbounds area of a court, such as within 5 seconds or within 10 seconds of the last contact of a ball with an inbounds area of a court. In yet another embodiment, the at least one umpire device 14 includes an integrated trigger application operable to arm and disarm the at least one net cord sensor.

Figure 2:
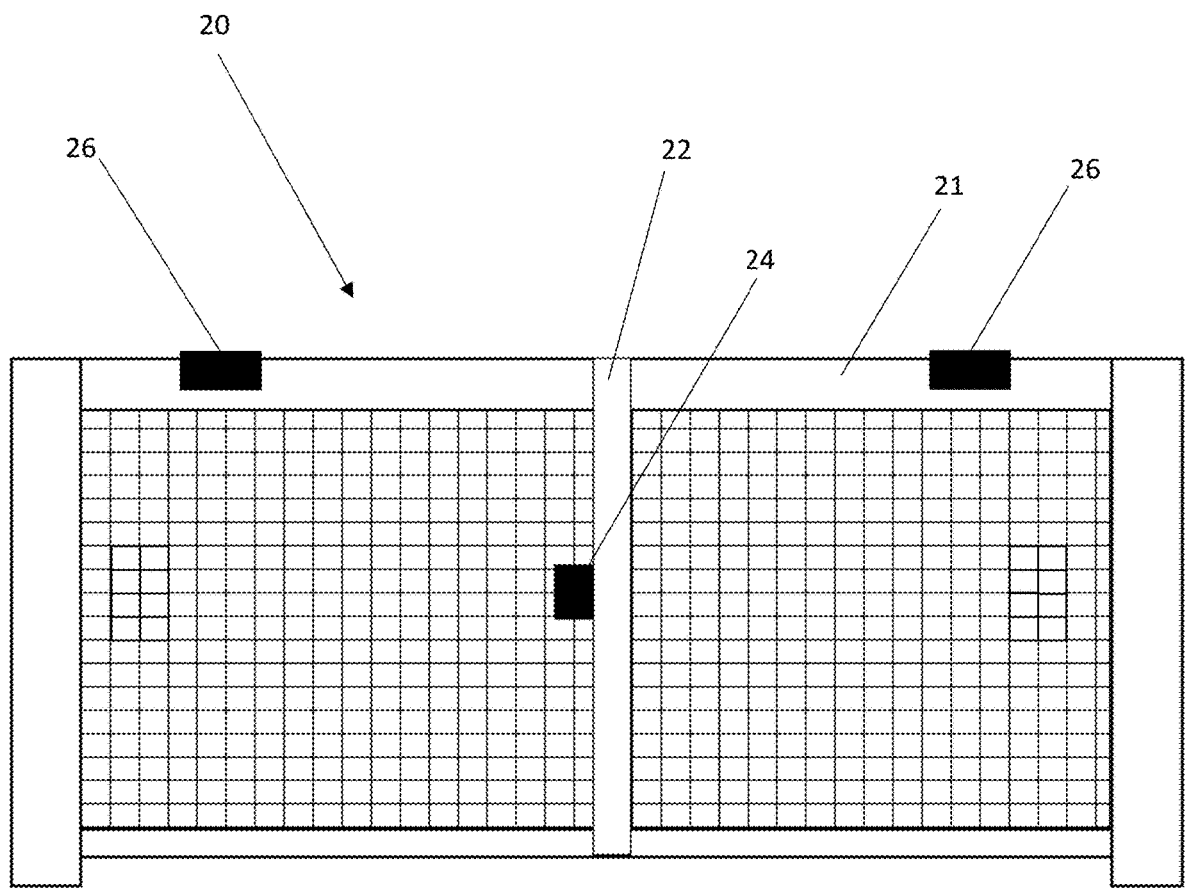
FIG. 2 illustrates a plurality of sensors attached to a net according to one embodiment of the present invention.

FIG. 2 illustrates a plurality of sensors attached to a net according to one embodiment of the present invention. A net 20 includes a center strap 22 extending from a net cord 21 at the top of the net 20 to the bottom of the net 20. In one embodiment, at least one sensor 24 is attached to the center strap 22. Advantageously, because the at least one sensor 24 is attached to the center strap and not to the net cord 21, there is a reduced likelihood that a ball will contact the at least one sensor 24 during a let and therefore a reduced likelihood of interference with the let determination. The at least one sensor 24 includes an accelerometer. When the net cord 21 is contacted, because the center strap 22 is in tension with the net cord 21, the contact causes the center strap 22 to move, resulting in movement of the accelerometer in the at least one sensor 24. As an accelerometer is being used, the acceleration of the net cord is being detected, rather than force, allowing for greater sensitivity in detecting contact between a ball and the net cord as evidenced by the acceleration of the net cord. In one embodiment, at least one peripheral sensor 26 is attached to a section of the net 20 other than the center strap 22. In one embodiment, the at least one peripheral sensor 26 is attached to the net cord 21 at a position away from a center region of the net cord 21. In one embodiment, the at least one peripheral sensor 26 is attached to a pinching element, operable to grip the net cord 21 such that the movement of the at least one peripheral sensor 26 is directly coupled to the movement of the net cord 21. The inclusion of the at least one peripheral sensor 26 better allows the system to detect contacts with the net cord that do not occur close to the center of the net 20 and therefore often do not propagate to the at least one sensor 24 as well as detecting contacts that occur near the center of the net 20.

Figure 3:
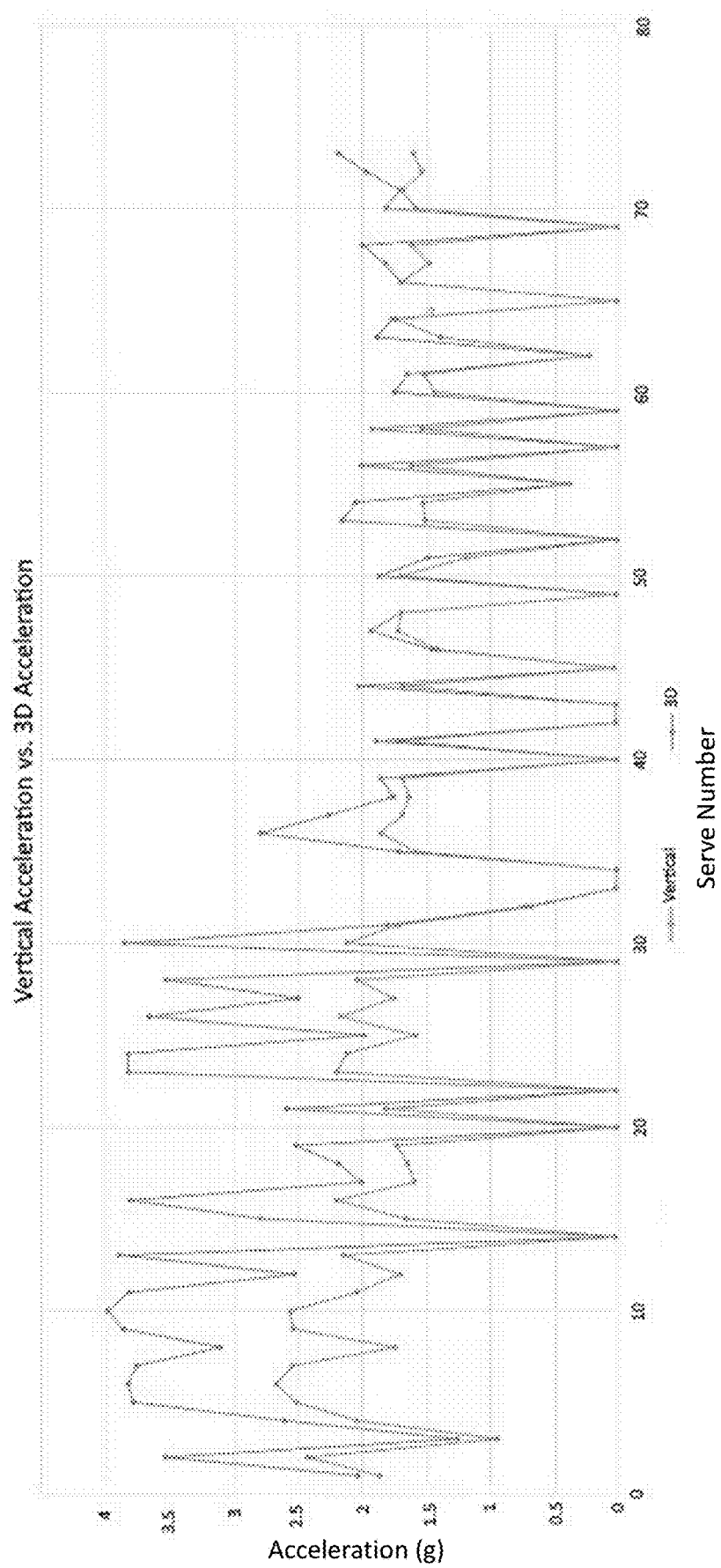
FIG. 3 illustrates a graph of vertical acceleration relative to a three-dimensional (3D) baseline gravitational vector according to one embodiment of the present invention.

FIG. 3 illustrates a graph of vertical acceleration relative to a 3D acceleration vector according to one embodiment of the present invention. In one embodiment, the accelerometer of the at least one sensor is operable to generate a three-dimensional (3D) baseline gravitational vector for the at least one sensor when the at least one sensor is detected to be at rest (e.g., movement of the at least one sensor is below a preset threshold). Importantly, the system does not include any means to measure force (such as a scale), and instead focuses on measuring acceleration for improved sensitivity. Developing a baseline vector is particularly useful in cases for ensuring accurate let detection where the net has bent out of a perfectly straight position during a match, which is often caused by something having previously contacted the net. Furthermore, developing a baseline vector is useful in cases where the sensor is contacted by a ball or another object is not moved away from its original alignment. The present system therefore solves an issue in the prior art by allowing the at least one sensor to be used when the net is not completely straight and therefore when the at least one sensor does not have an identical orientation relative to the ground compared to its orientation when originally installed. For FIG. 3, instances where a ball struck the net, where the ball grazed the net (a more typical let situation), and instances where the ball did not contact the net are shown. Points where the ball did not contact the net (and therefore which indicated a "good serve") are the ones on the chart with close to 0 acceleration, including, but not limited to, Serve Number 14, Server Number 20, and Serve Number 22. Points where the ball struck the net typically showed substantially vertical acceleration in addition to substantial horizontal acceleration, causing there to be a substantial, visible difference between total 3D acceleration and vertical acceleration, as shown, for example, with Serve Numbers 4-13. Points where the ball grazed the net, indicating a let, demonstrated substantial vertical acceleration, but only small amounts of horizontal acceleration, causing the total 3D acceleration and vertical acceleration lines to be close, such as with, for example, Serve Number 41, Serve Number 44, and Serve Number 46.

The accelerometer detects acceleration acting upon the at least one sensor in at least two directions (and most often at least three directions), but when the net is not perfectly straight (or the sensor is not perfectly aligned with the ground), the accelerometer cannot simply be set to assume that the axes of the accelerometer correspond to perfectly horizontal and/or vertical axes. Therefore, by generating a three-dimensional acceleration vector when the accelerometer is at rest, the at least one sensor is able to determine the gravitational vector acting upon at least one sensor as a combination of one or more of the directional vectors programmed into the accelerometer. In one embodiment, the 3D baseline gravitational vector is therefore an adjusted vertical axis. A vector orthogonal to the adjusted vertical axis is therefore able to be described as an adjusted horizontal axis. In one embodiment, when the at least one vector begins to move, a let is detected when the at least one sensor detects a change in acceleration relative to the adjusted vertical axis that is greater than a preset threshold. In one embodiment, the system does not take into account the amount of horizontal acceleration and only makes decisions based on vertical acceleration. In one embodiment, the preset threshold is approximately 0.2 g (where g is equal to 9.8 m/s$^2$). In one embodiment, the at least one sensor does not take into account acceleration along the adjusted horizontal axis when determined the presence of a let, allowing the system to better factor out environmental factors such as wind. In another embodiment, based on the data gathered by the accelerometer, the at least one sensor automatically detects a magnitude of displacement of the net cord. In one embodiment, a let is detected when the magnitude of the displacement of the net cord is greater than a preset quantity.

In one embodiment, the 3D baseline gravitational vector is generated at a preset interval when the accelerometer does not detect any change in acceleration (e.g., every 1 second, every 5 seconds, every 10 seconds, etc. when there is no detected change in acceleration). In another embodiment, the 3D baseline gravitational vector is generated each time the magnitude of the jerk (or rate of change of acceleration) of the 3D baseline gravitational vector drops below a preset threshold. In yet another embodiment, the 3D baseline gravitational vector is generated each time a calibration signal is received from the at least one umpire device.

In one embodiment, if the system includes multiple sensors, acceleration data from each sensor is transmitted to a common processor, and an averaged amount of movement along adjusted vertical axes for each sensor is compared to a threshold value in order to determine whether contact with the net cord has occurred. In a preferred embodiment, if the system includes multiple sensors, the at least one sensor determines contact to have occurred if the amount of movement along an adjusted vertical axis for any of the multiple sensors exceeds a threshold value.

Figure 4:
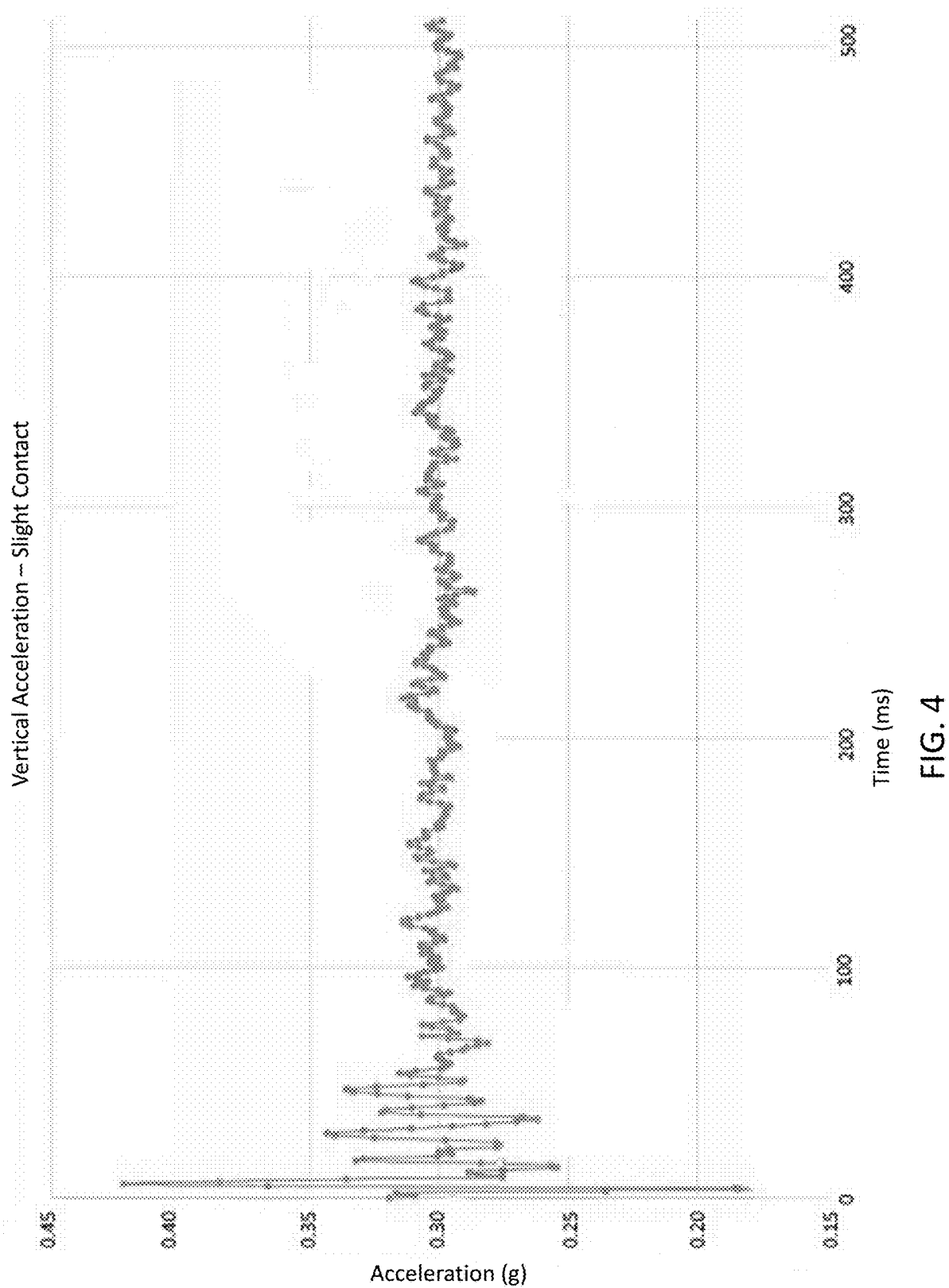
FIG. 4 illustrates a graph of vertical acceleration shortly after an incidental contact between a ball and a net cord according to one embodiment of the present invention.

FIG. 4 illustrates a graph of vertical acceleration shortly after an incidental contact between a ball and a net cord according to one embodiment of the present invention. As is able to be seen in FIG. 4, even when only a slight contact between a ball and a net cord occurs, there is a sufficient amount of vertical motion of the at least one sensor in order to detect a let (e.g., a difference in maximum vertical acceleration greater than about 0.2 g).

In one embodiment, if the at least one sensor detects contact has occurred, the at least one umpire device receives an alert including a contact indication and an umpire is then able to determine whether the service was otherwise legal in order to determine if a let has occurred. In another embodiment, the at least one sensor is in network communication with at least one play detector (e.g., at least one line call system) operable to detect where a ball contacts a tennis court. In one embodiment, the at least one sensor is operable to transmit to the at least one play detector a confirmation of whether the ball contacted the net cord. The at least one play detector then automatically determines whether the service was otherwise valid and reports to the at least one umpire device whether a let or a fault has occurred. In another embodiment, the at least one play detector is operable to automatically determine whether a service was valid and subsequently transmit the determination to the at least one sensor. If the play was otherwise valid and a net cord contact has occurred, the at least one sensor transmits a notification of a let to the at least one umpire device. If the play was otherwise valid and no net cord contact has occurred, the at least one sensor does not transmit a notification to the at least one umpire device. If the play was not otherwise valid, then the at least one sensor transmits a notification of a fault to the at least one umpire device.

Figure 5:
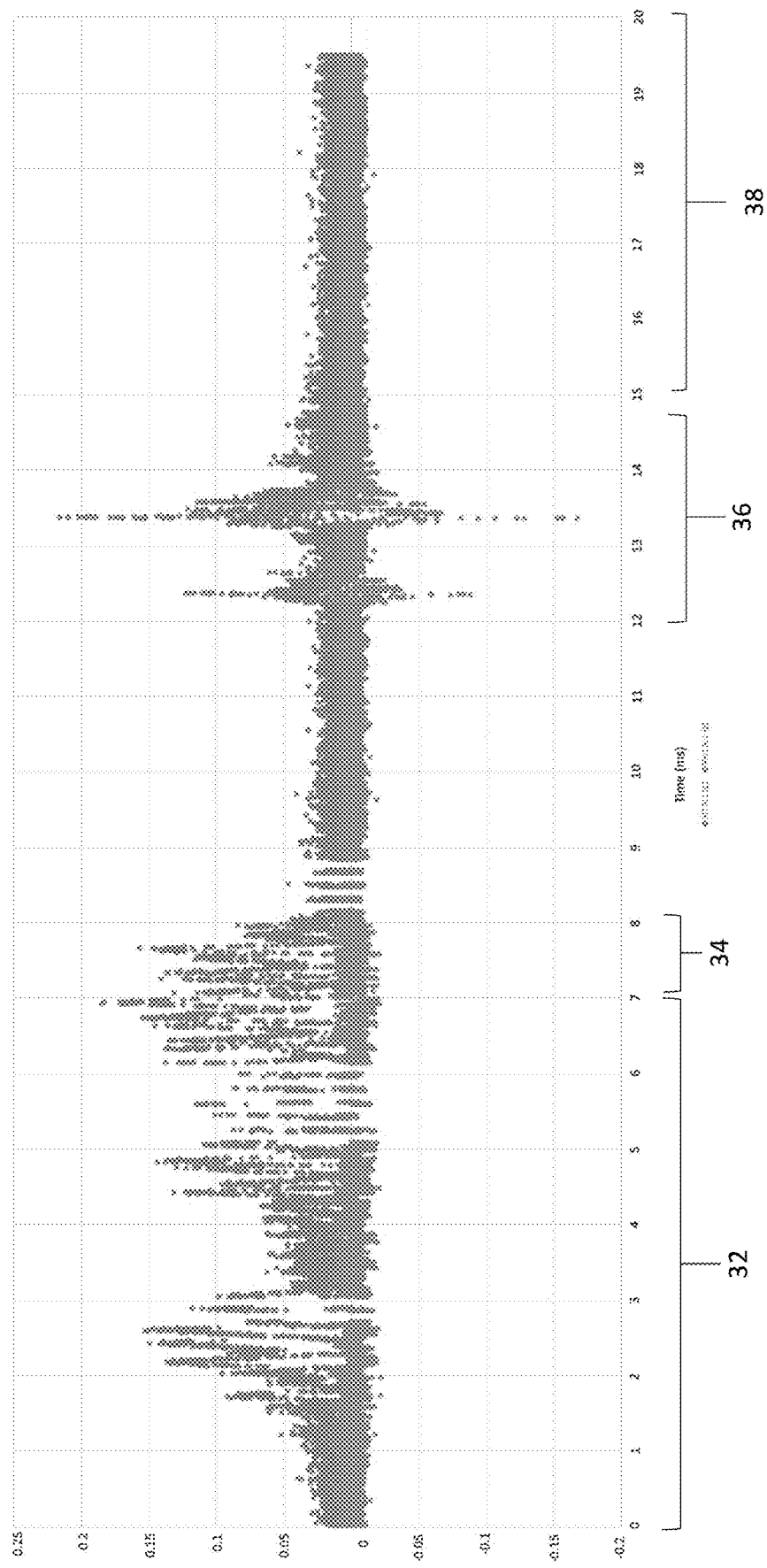
FIG. 5 illustrates a graph of vertical acceleration under a plurality of conditions according to one embodiment of the present invention.

FIG. 5 illustrates a graph of vertical acceleration under a plurality of conditions according to one embodiment of the present invention. Section 32 of FIG. 5 demonstrates a simulation of the effect of wind on a net cord via shaking the net cord back and forth horizontally. Section 32 shows relatively low variation in vertical acceleration, which is below the minimum threshold needed to detect a let. Section 34 shows residual movement of the net after the simulation of wind has stopped. Section 36 of the graph shows the acceleration of the net cord when the top of the net cord is tapped, showing a larger variation in vertical acceleration, sufficient to activate a threshold to detect a let. Section 38 of the graph shows baseline movement of the net cord when no forces are applied to the net cord. As shown by the difference between Sections 32 and 36, the isolation of vertical acceleration of the net improves an ability to detect lets, while filtering out the effects of weather.

One of ordinary skill in the art will understand that the types of accelerometers able to be used with the present invention are not intended to be limiting. Examples of accelerometers able to be used in the present invention include, but are not limited to, those described in U.S. Pat. Nos. 10,209,072, 10,585,111, 6,789,424, and 10,234,477, each of which is incorporated herein by reference in its entirety. In one embodiment, the accelerometer has an acceleration range of about +/−2 g. In one embodiment, the accelerometer has a sensitivity of about 16384 LSB/g (least significant bit per g). In one embodiment, the nonlinearity error of the accelerometer is about 0.6% F.S. In one embodiment, the cross-axis sensitivity between any two axes of the accelerometer is about +/−2%. In one embodiment, the output data range of the accelerometer is between about 0.5 Hz and about 1000 Hz. In one embodiment, the accelerometer has a root mean squared (RMS) noise of about 0.7 mg-RMS along x and y axes and about 1.3 mg-RMS along a z-axis. One of ordinary skill in the art will appreciate that the values provided above for the acceleration range, sensitivity, RMS Noise, nonlinearity error, cross-axis sensitivity, and output data rate are meant to be illustrative only and in no way limiting on the specifications of the accelerometers used for the present invention.

In one embodiment, the at least one sensor includes at least one gyro sensor, operable to determine an angular velocity of the at least one sensor. In one embodiment, the at least one gyro sensor is able to determine an instantaneous 3D change to the adjusted vertical axis in real time as a result of, for example, a force applied to the net that shifts the orientation of the at least one sensor. The at least one gyro sensor is sometimes important in situations where, for example, wind blows the net such that the at least one sensor rotates by 90°. While significant changes in orientation of the sensor are unlikely when the at least one sensor is attached to the net strap, it is possible that the change in orientation in some situations makes the difference between detecting a let and not detecting a let. Because the system has not yet determined the at least one sensor to be at rest while the wind is blowing, the adjusted vertical axis would end up aligned along a horizontal axis in this situation, with the wind appearing to generate movement of the net above the preset threshold. Therefore, by detecting the angular velocity of the at least one sensor, a change in orientation for the at least one sensor is determined and the adjusted vertical axis is updated in real time.

Figure 6:
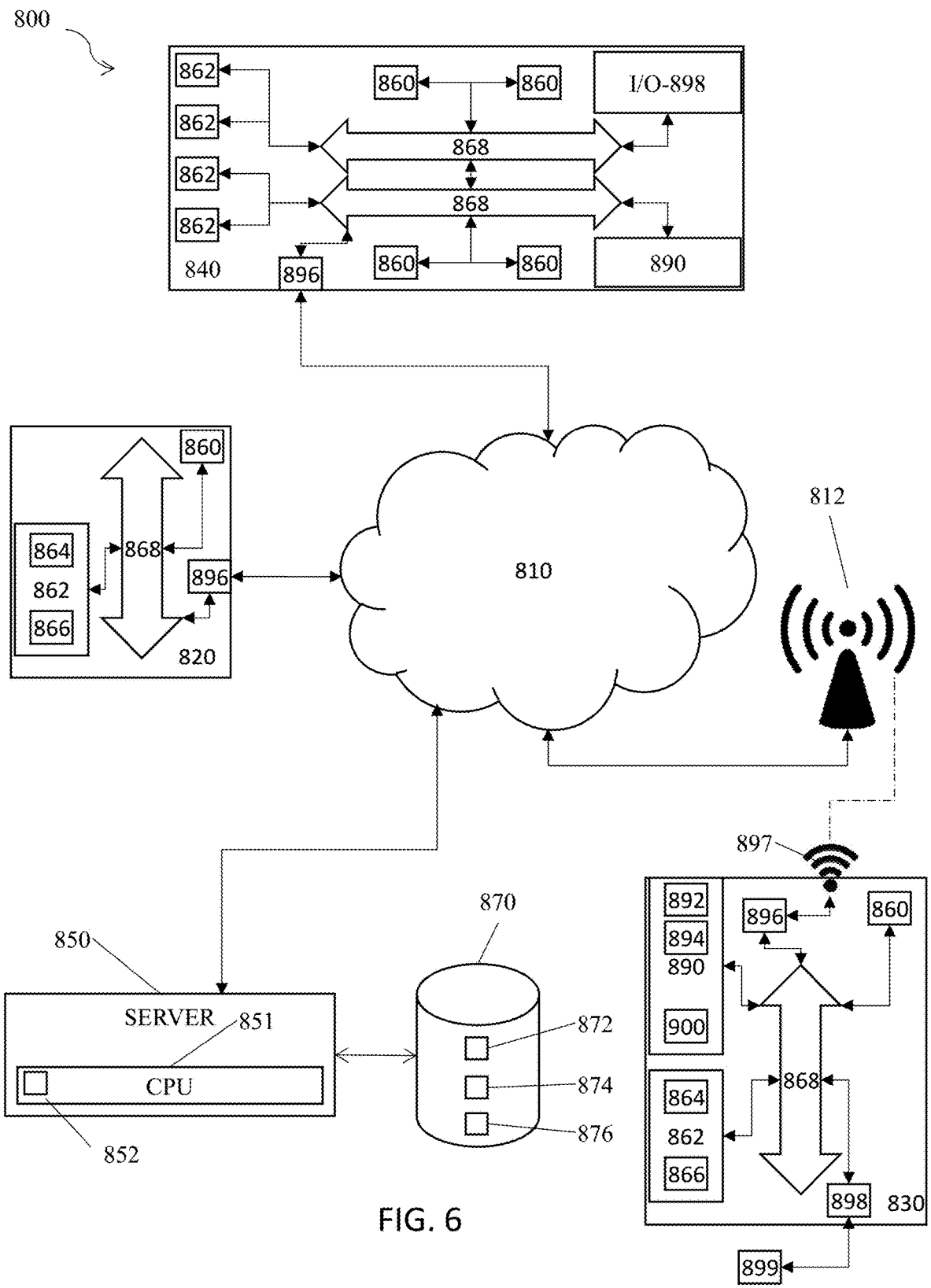
FIG. 6 is a schematic diagram of a system of the present invention.

FIG. 6 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus

868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 6, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 6, is operable to include other components that are not explicitly shown in FIG. 6, or is operable to utilize an architecture completely different than that shown in FIG. 6. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for detecting net cord contact, comprising:
at least one sensor, coupled with a processor and a memory, attached to a net including a net cord;

wherein the at least one sensor is in network communication with at least one umpire device;

wherein the at least one sensor includes at least one accelerometer, operable to generate three-dimensional (3D) acceleration data;

wherein the at least one sensor is operable to detect when the net cord is substantially at rest and determine an adjusted vertical axis when the net cord is substantially at rest;

wherein the at least one sensor is operable to automatically determine a vertical acceleration for the net cord, wherein the vertical acceleration is a component of the 3D acceleration data along the adjusted vertical axis; and wherein the at least one sensor is configured to transmit an alert to the at least one umpire device when a change in the vertical acceleration of the net cord exceeds a preset threshold.

2. The system of claim 1, wherein the preset threshold is about 0.2 g.

3. The system of claim 1, wherein the at least one sensor includes at least one sensor not attached to the net cord.

4. The system of claim 1, wherein one or more of the at least one sensor are attached to a net strap, wherein the net strap is a component of the net in tension with the net cord.

5. The system of claim 1, wherein the at least one sensor includes a plurality of sensors, wherein one or more of the plurality of sensors are attached directly to the net cord.

6. The system of claim 1, wherein the net cord is determined to be substantially at rest when 3D acceleration measured by the at least one sensor is below a second preset threshold.

7. The system of claim 1, wherein the at least one sensor and the at least one umpire device communicate over a WI-FI network and/or a BLUETOOTH network.

8. A method for detecting net cord contact, comprising:
providing at least one sensor including at least one accelerometer, coupled with a processor and a memory, attached to a net including a net cord;

wherein the at least one sensor is in network communication with at least one umpire device;

the at least one accelerometer generating three-dimensional (3D) acceleration data;

the at least one sensor detecting when the net cord is substantially at rest and determining an adjusted vertical axis when the net cord is substantially at rest;

the at least one sensor automatically determining a vertical acceleration for the net cord, wherein the vertical acceleration is a component of the 3D acceleration data along the adjusted vertical axis; and the at least one sensor transmitting an alert to the at least one umpire device when a change in the vertical acceleration of the net cord exceeds a preset threshold.

9. The method of claim 8, wherein the preset threshold is about 0.2 g.

10. The method of claim 8, wherein the at least one sensor includes at least one sensor not attached to the net cord.

11. The method of claim 8, wherein one or more of the at least one sensor are attached to a net strap, wherein the net strap is a component of the net in tension with the net cord.

12. The method of claim 8, wherein the at least one sensor includes a plurality of sensors, wherein one or more of the plurality of sensors are attached directly to the net cord.

13. The method of claim 8, further comprising the at least one sensor determining the net cord is substantially at rest when 3D acceleration measured by the at least one sensor is below a second preset threshold.

14. The method of claim 8, further comprising the at least one sensor generating the 3D acceleration data in real time.

15. The method of claim 8, further comprising the at least one sensor and the at least one umpire device communicating over a WI-FI network and/or a BLUETOOTH network.

16. A system for detecting net cord contact, comprising:
at least one sensor, coupled with a processor and a memory, attached to a net including a net cord;

wherein the at least one sensor is in network communication with at least one umpire device;

wherein the at least one sensor includes at least one net strap sensor attached to a net strap, wherein the net strap is a component of the net in tension with the net cord;

wherein the at least one sensor includes one or more sensors attached directly to the net cord;

wherein the at least one sensor includes at least one accelerometer, operable to generate three-dimensional (3D) acceleration data in real time;

wherein the at least one sensor is operable to detect when the net cord is substantially at rest and determine an adjusted vertical axis when the net cord is substantially at rest;

wherein the at least one sensor is operable to automatically determine a vertical acceleration for the net cord, wherein the vertical acceleration is a component of the 3D acceleration data along the adjusted vertical axis;

wherein the at least one sensor is configured to transmit an alert to the at least one umpire device when a change in the vertical acceleration of the net cord exceeds a preset threshold; and wherein the net cord is determined to be substantially at rest when the 3D acceleration measured by the at least one sensor is below a second preset threshold.

17. The system of claim 16, wherein the at least one sensor is in network communication with a line call system, and wherein based on data received from the line call system, the alert includes a determination of whether a serve was a let or a fault.

18. The system of claim 16 wherein the preset threshold is about 0.2 g.

19. The system of claim 16, wherein the system does not utilize a scale or any other means to measure force to determine the 3D acceleration of the net cord.

20. The system of claim 1, wherein the at least one accelerometer includes a plurality of accelerometers, and wherein a distinct adjusted vertical axis is generated for each of the plurality of accelerometers.

* * * * *